United States Patent
Kitazawa et al.

(10) Patent No.: US 11,274,711 B2
(45) Date of Patent: Mar. 15, 2022

(54) CLUTCH DEVICE

(71) Applicant: EXEDY Corporation, Neyagawa (JP)

(72) Inventors: Hidenori Kitazawa, Neyagawa (JP); Osamu Mano, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 17/083,579

(22) Filed: Oct. 29, 2020

(65) Prior Publication Data

US 2021/0164524 A1 Jun. 3, 2021

(30) Foreign Application Priority Data

Dec. 3, 2019 (JP) .............................. JP2019-218993

(51) Int. Cl.
*F16D 13/56* (2006.01)
*F16D 13/75* (2006.01)
*F16D 13/52* (2006.01)

(52) U.S. Cl.
CPC ............ *F16D 13/752* (2013.01); *F16D 13/52* (2013.01); *F16D 2013/565* (2013.01)

(58) Field of Classification Search
CPC ...................................... F16D 13/56–2013/565
See application file for complete search history.

(56) References Cited

U.S. PATENT DOCUMENTS

| | | | |
|---|---|---|---|
| 6,461,092 B2* | 10/2002 | Tseng ................... | F16B 13/128 411/178 |
| 2017/0159725 A1* | 6/2017 | Imanishi ................ | F16D 13/56 |
| 2021/0199143 A1* | 7/2021 | Schneider ............ | F16B 31/043 |

FOREIGN PATENT DOCUMENTS

JP          2017-101810 A          6/2017

\* cited by examiner

*Primary Examiner* — Ernesto A Suarez
*Assistant Examiner* — James J Taylor, II
(74) *Attorney, Agent, or Firm* — United IP Counselors, LLC

(57) ABSTRACT

A clutch device includes a first rotor, a second rotor, a third rotor, at least one bolt, at least one anti-slip member, and a cam mechanism. The first rotor has a first cam surface and a first fitting hole extending in an axial direction. The second rotor has a second cam surface. The third rotor has a second fitting hole. The second cam surface presses the first cam surface in a circumferential direction. The second fitting hole faces the first fitting hole and extends in the axial direction. The third rotor is fixed to the first rotor. The bolt connects the first rotor and the third rotor. The anti-slip member fits into the first and second fitting holes. The cam mechanism includes the first cam surface and the second cam surface, and moves the second rotor in the axial direction when relative rotation occurs between the first rotor and the second rotor.

4 Claims, 8 Drawing Sheets

CLUTCH DEVICE

CROSS-REFERENCE TO RELATED APPLICATIONS

This application claims priority to Japanese Patent Application No. 2019-218993, filed on Dec. 3, 2019. The contents of that application are incorporated by reference herein in their entirety.

TECHNICAL FIELD

The present invention relates to a clutch device.

BACKGROUND ART

For example, in motorcycles, such as buggies, a clutch device is used to transmit or cut off power from an engine to a transmission. This clutch device includes a clutch center, a clutch portion for transmitting and disconnecting power between them, and a pressure plate for pressing the clutch portion. The clutch center is connected to the support plate by bolts.

There has been proposed a clutch device provided with a cam mechanism for increasing or decreasing a pressing force on a clutch portion by relative rotation of the pressure plate and the support plate (Japanese Patent Laid-Open No. 2017-101810)).

BRIEF SUMMARY

However, when a clutch device has a cam mechanism, a bolt may loosen.

The subject of the present invention is to suppress looseness of a bolt, which fastens between members.

(1) A clutch device according to one aspect of the present invention includes a first rotor, a second rotor, a third rotor, at least one bolt, at least one anti-slip member, and a cam mechanism. The first rotor has a first cam surface and a first fitting hole extending in an axial direction. The second rotor has a second cam surface. The third rotor has a second fitting hole. The second cam surface is configured to press the first cam surface in a circumferential direction. The second fitting hole faces the first fitting hole and extends in the axial direction. The second rotor is arranged so as to be movable in the axial direction and relatively rotatable with respect to the first rotor. The third rotor is fixed to the first rotor. The bolt connects the first rotor and the third rotor. The anti-slip member is fitted into the first fitting hole and the second fitting hole. The cam mechanism includes the first cam surface and the second cam surface, and moves the second rotor in the axial direction when relative rotation occurs between the first rotor and the second rotor.

In the device of (1), an anti-slip member that fits in the first fitting hole and the second fitting hole is arranged. Therefore, it is possible to suppress loosening of a bolt between members without reducing torque that can be transmitted on fastening surfaces between members.

(2) Preferably, the anti-slip member has a cylindrical shape, and the bolt extends inside the anti-slip member.

In this case, slip of the fastening surfaces between a support plate and a clutch center can be suppressed more stably.

(3) Preferably, at least one bolt includes a plurality of bolts arranged at intervals in the circumferential direction, and at least one of the plurality of bolts extend inside the anti-slip member.

In this case, not all the bolts extend inside anti-slip member, so that a support plate and a clutch center can be easily assembled.

(4) Preferably, the number of anti-slip members is less than the number of bolts.

In this case, the assembling property of the support plate and the clutch center is improved.

(5) Preferably, the first rotor is a support plate, the second rotor is a pressure plate, and the third rotor is a clutch center.

In the present invention as described above, it is possible to suppress loosening of a bolt between members.

DETAILED DESCRIPTION

[Overall Structure]

Figure 1:
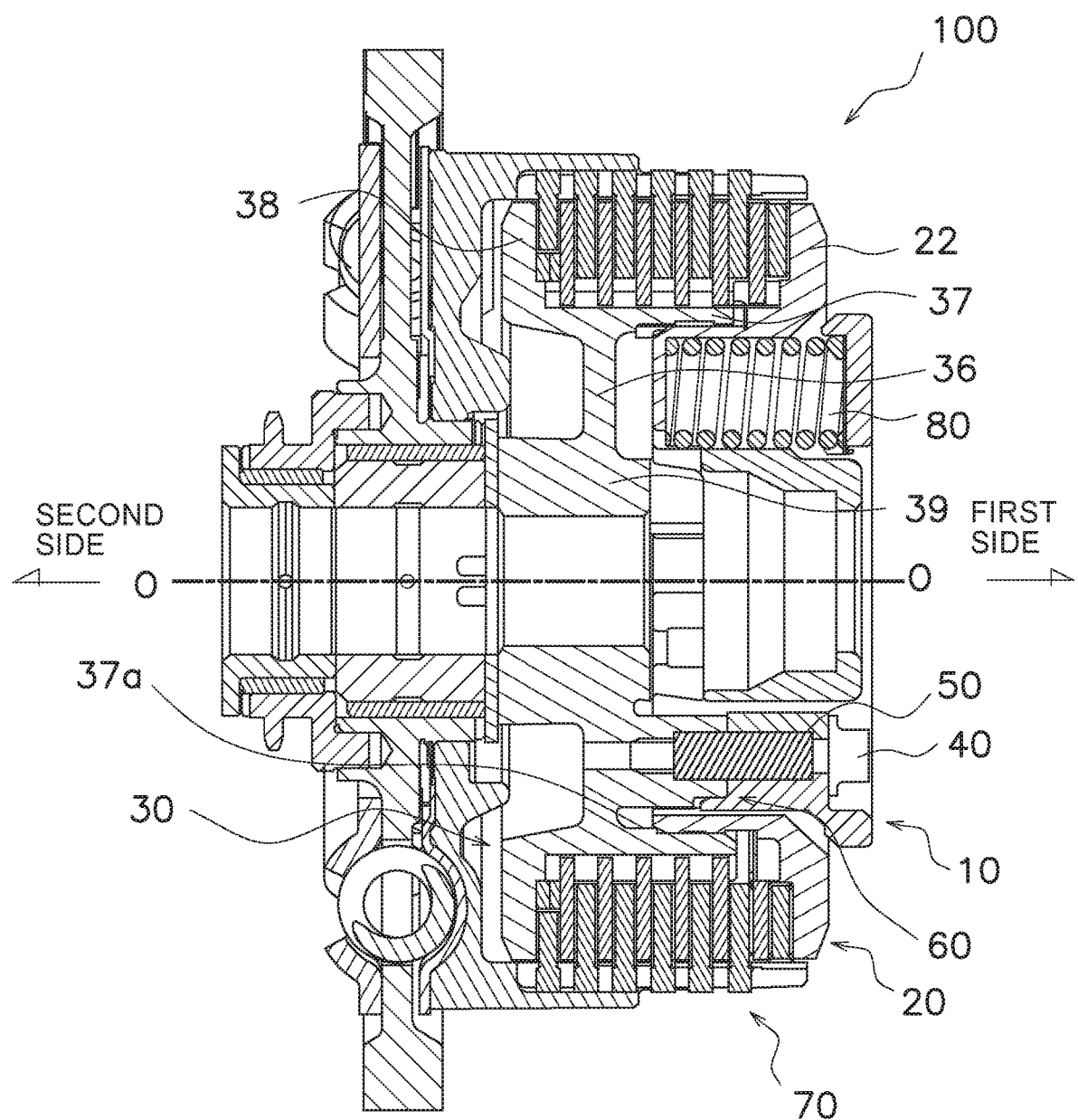
FIG. 1 is a sectional view of a clutch device according to an embodiment of the present invention.

FIG. 1 shows a motorcycle clutch device 100 as a clutch device according to an embodiment of the present invention. FIG. 1 is a sectional view of the clutch device 100. In the sectional view of FIG. 1, the line O-O is a rotation axis. In the following description, "axial direction" means the direction, in which the rotation axis O extends, and as illustrated in FIG. 1, right side of FIG. 1 is a "first axial direction," and the opposite is a "second axial direction." Further, "radial direction" means a radial direction of a circle around the rotation axis O, and "circumferential direction" means a circumferential direction of a circle around the rotation axis O.

The clutch device 100 is configured to transmit power from an engine to a transmission and to cut off the transmission. The clutch device 100 includes a support plate 10 (an example of a first rotor), a pressure plate 20 (an example of a second rotor), a clutch center 30 (an example of a third rotor), a plurality of bolts 40, a plurality of anti-slip members 50, and a cam mechanism 60.

[Support Plate 10]

Figure 2:
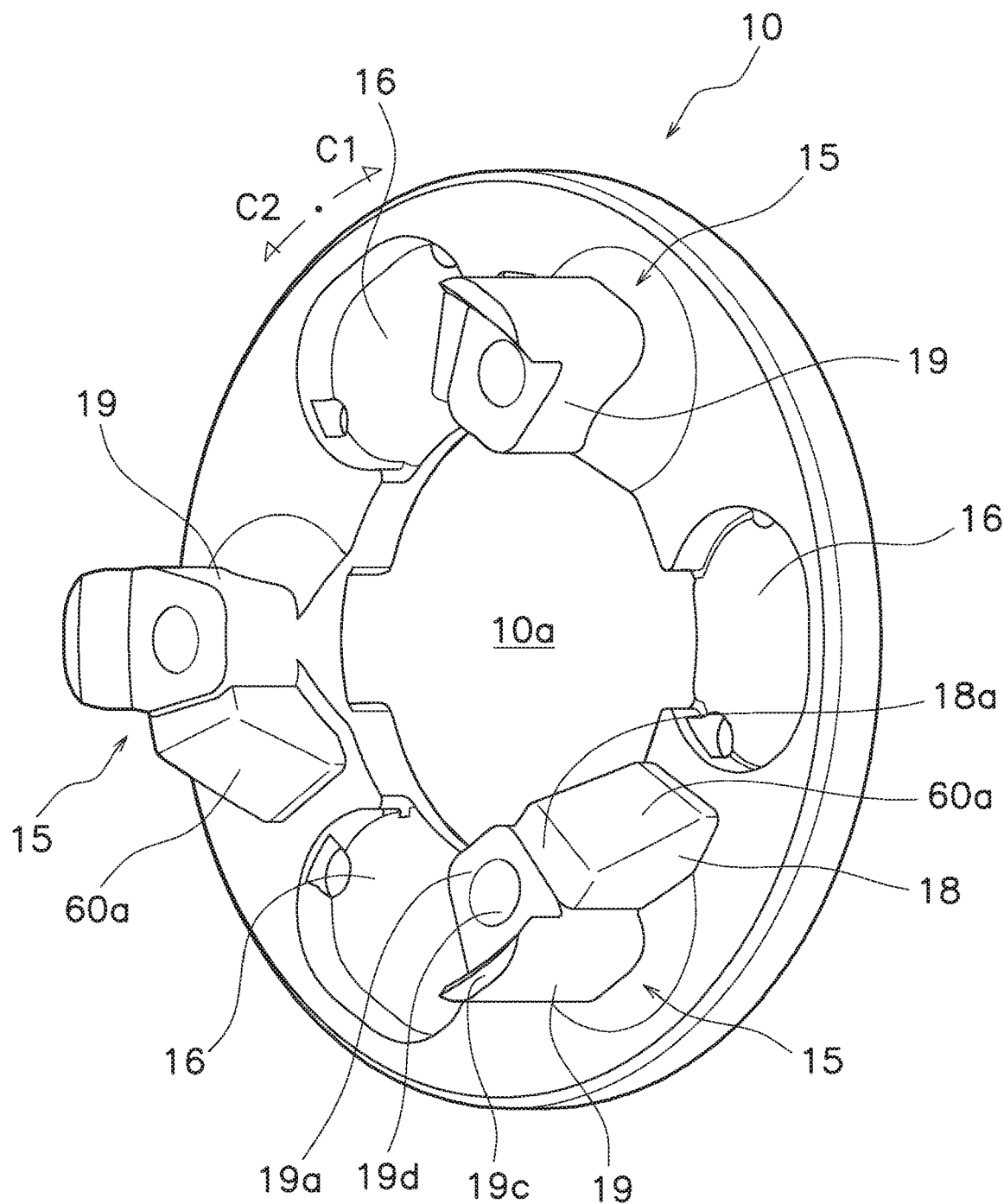
FIG. 2 is an external perspective view of a support plate.

As illustrated in FIGS. 1 and 2, the support plate 10 is a disk-shaped member. The support plate 10 is arranged on a first side in the axial direction with respect to the pressure plate 20. The support plate 10 has a hole 10*a* in a center. The support plate 10 also has a plurality of first protrusions 15 and a plurality of supporting recesses 16. In addition, in this embodiment, the support plate 10 has three first protrusions 15 and three support recesses 16.

The plurality of first protrusions 15 are arranged at intervals in the circumferential direction. Preferably, the plurality of first protrusions 15 are arranged at equal intervals in the circumferential direction. The first protrusion 15 projects to the second side in the axial direction. The first protrusion 15 has a first cam protrusion 18 and a first fixing protrusion 19. The first cam protrusion 18 and the first fixing protrusion 19 are arranged in the circumferential direction. The first cam protrusion 18 and the first fixing protrusion 19 are formed as one member.

The first cam protrusion 18 has a first cam surface 60a.

Height of the first fixing protrusion 19 is higher than height of the first cam protrusion 18. That is, a front end surface 19a (an end surface on the second side in the axial direction) of the first fixing protrusion 19 is located on the second side in the axial direction with respect to a front end surface 18a of the first cam protrusion 18. The height of the first fixing protrusion 19 is a length of the first fixing protrusion 19 in the axial direction.

Further, a first fitting hole 19d extending in the axial direction is formed at a central portion of the first fixing protrusion 19. The first fitting hole 19d is a gap between an inner wall surface of the support plate 10 and the bolt 40. A through hole (not illustrated) extending in the axial direction extends further on the first side of the first fitting hole 19d at the central portion of the first fixing protrusion 19.

A positioning portion 19c is formed on an outer side of the first fixing protrusion 19 so as to project further toward the second side in the axial direction than the front end surface 19a of the first fixing protrusion 19.

The supporting recess 16 is formed at a predetermined depth on a side surface of the support plate 10 on the second side in the axial direction. A spring seat (not illustrated) is arranged in the supporting recess 16.

[Pressure Plate 20]

Figure 3:
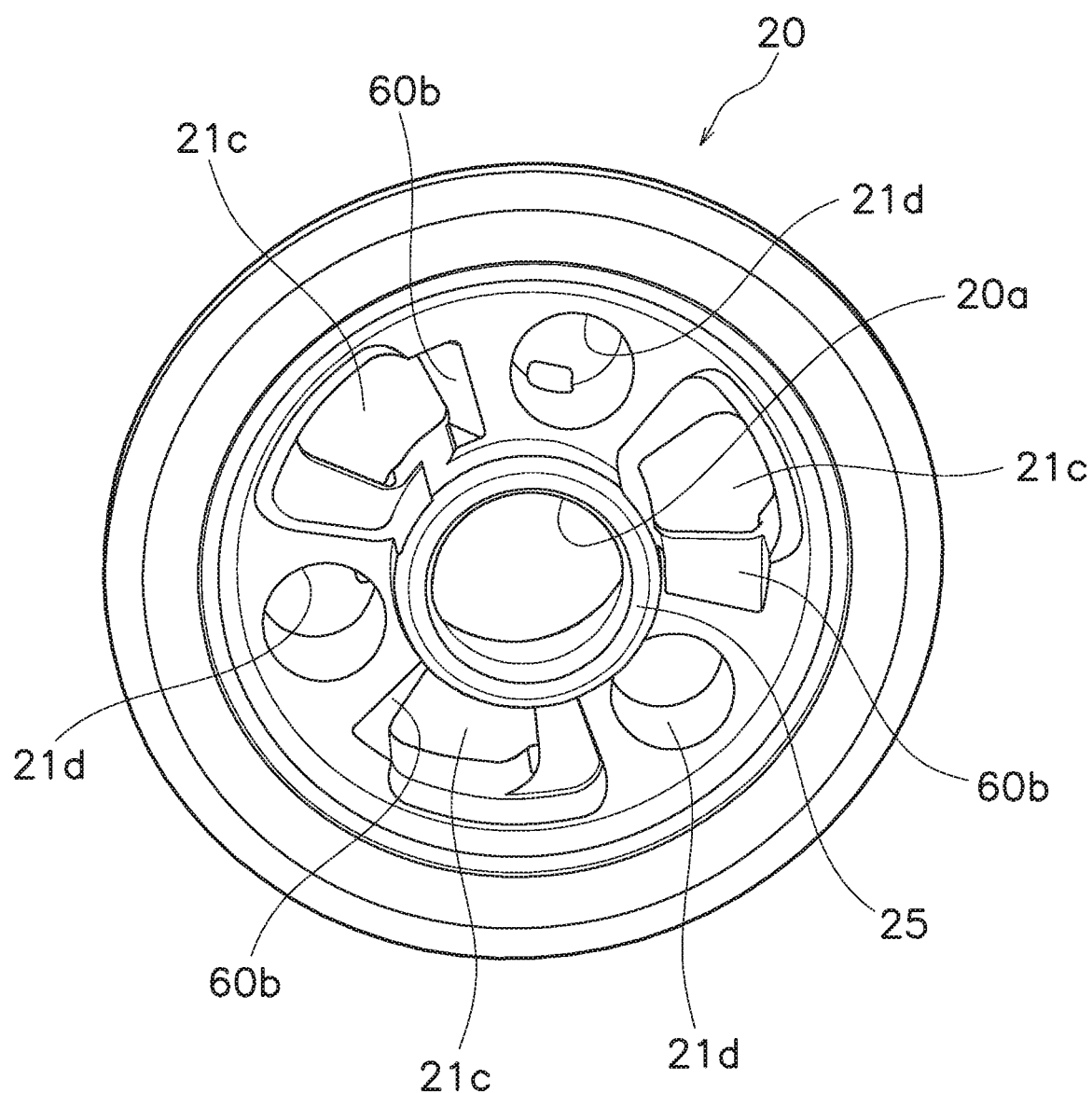
FIG. 3 is an external perspective view of a pressure plate viewed from a first side in an axial direction.
Figure 4:
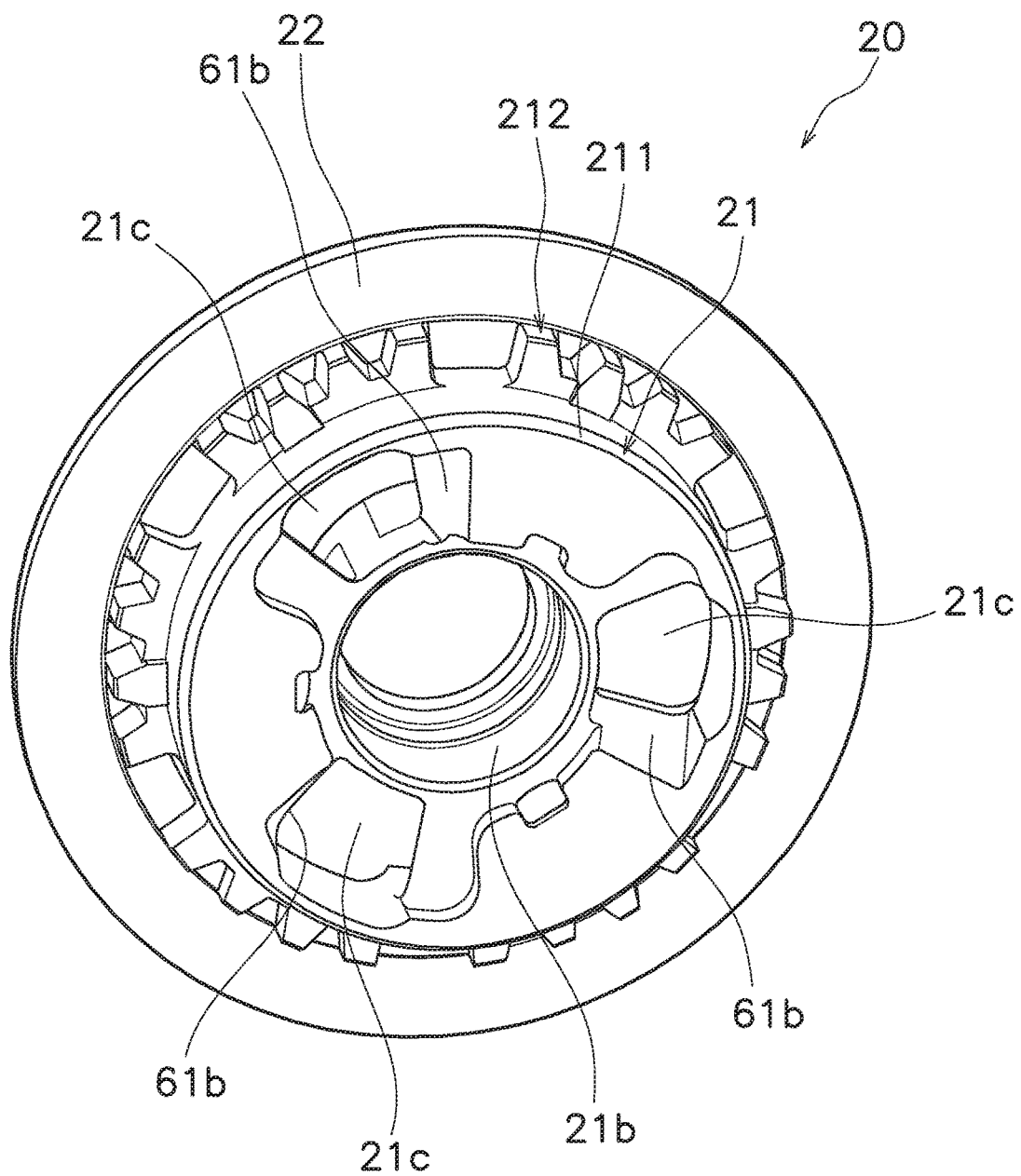
FIG. 4 is an external perspective view of a pressure plate viewed from a second side in an axial direction.

FIG. 3 is a view of the pressure plate 20 as viewed from the support plate 10 side, and FIG. 4 is a view of the pressure plate 20 as viewed from the side opposite to the support plate 10. As illustrated in FIGS. 1, 3 and 4, the pressure plate 20 is a disk-shaped member. The pressure plate 20 is arranged on the second side of the support plate 10 in the axial direction.

The pressure plate 20 is axially movable with respect to the support plate 10 and the clutch center 30. The pressure plate 20 has a boss portion 25 formed in a central portion, a tubular portion 21, and a pressing portion 22.

The boss portion 25 extends so as to project to the first side in the axial direction. The boss portion 25 penetrates the hole 10a of the support plate 10. A through hole 20a is formed in a center of the boss portion 25. A release member (not illustrated) is inserted into the through hole 20a.

The tubular portion 21 is formed outside the boss portion 25 in the radial direction. The tubular portion 21 projects to the second side in the axial direction.

The tubular portion 21 has a cylindrical main body 211 and a plurality of first teeth 212. The first teeth 212 are formed on an outer peripheral surface of the main body 211. The plurality of first teeth 212 are provided on the outer peripheral surface of the main body 211 at an end on the first side in the axial direction. Axial length of the plurality of first teeth 212 is shorter than axial length of the main body 211.

The tubular portion 21 has a substantially circular hole 21b formed in a center, a plurality of cam holes 21c, and a plurality of bottomed holes 21d. In the present embodiment, the tubular portion 21 has three cam holes 21c and three bottomed holes 21d.

The pressure plate 20 has a second cam surface 60b for the cam mechanism 60 and a PPs-cam surface 61b for a slipper cam mechanism 61. The second cam surface 60b and the PPs-cam surface 61b are formed by an inner wall surface that defines the cam hole 21c. The second cam surface 60b and the PPs-cam surface 61b are opposed to each other in the circumferential direction. The second cam surface 60b faces the first side in the axial direction. The PPs-cam surface 61b faces the second axial side.

The bottomed hole 21d is formed with a predetermined depth from the surface on the first side in the axial direction. As illustrated in FIG. 1, a coil spring 80 is arranged in this bottomed hole 21d. The coil spring 80 is in contact with a spring seat arranged in the supporting recess 16 of the support plate 10. The coil spring 80 is arranged between the bottom surface of the bottomed hole 21d and the supporting recess 16 of the support plate 10. The coil spring 80 energizes the pressure plate 20 toward the second side in the axial direction.

The pressing portion 22 is formed in an annular shape and is formed on an outer side portion of the pressure plate 20. The pressing portion 22 has a friction surface that faces the second side in the axial direction. Further, the pressing portion 22 is arranged in the axial direction with a distance from the pressure receiving portion 38 of the clutch center 30. A clutch portion 70 is arranged between the pressing portion 22 and the pressure receiving portion 38. That is, the pressure receiving portion 38, the clutch portion 70, and the pressing portion 22 are arranged in this order from the second side to the first side in the axial direction.

[Clutch Center 30]

As illustrated in FIG. 1, the clutch center 30 is arranged on the second side of the pressure plate 20 in the axial direction. The clutch center 30 has a substantially disc shape. The clutch center 30 has a boss portion 39 formed in a central portion, a disc portion 36, a tubular portion 37, and a pressure receiving portion 38.

The boss portion 39 extends in the axial direction. A spline hole (not illustrated) extending in the axial direction is formed at the center of the boss portion 39. An input shaft (not illustrated) of a transmission is engaged with the spline hole. The clutch center 30 does not move in the axial direction.

Figure 5:
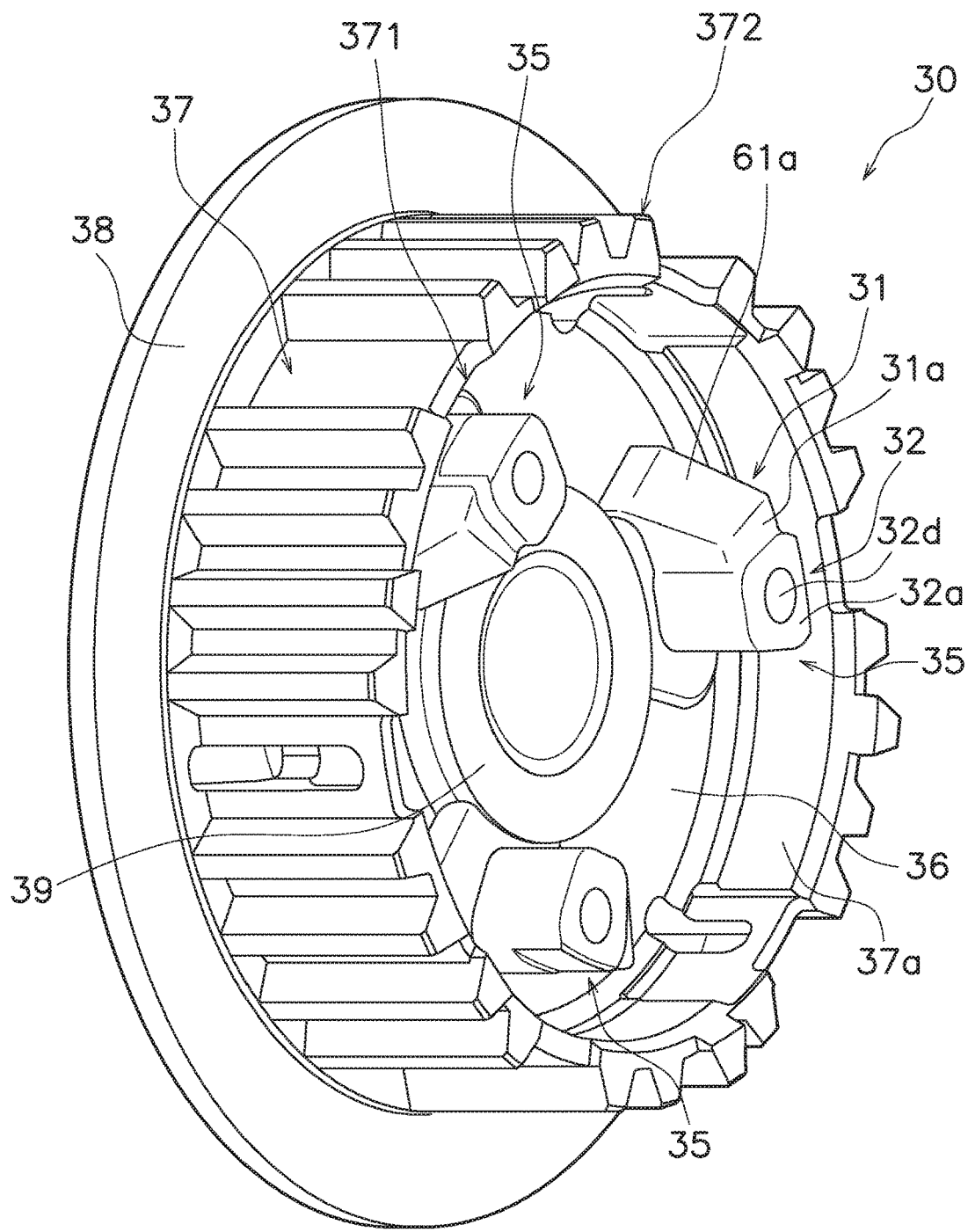
FIG. 5 is an external perspective view of a clutch center.

The disc portion 36 extends outward from the boss portion 39 in the radial direction. As illustrated in FIGS. 1 and 5, the disc portion 36 is formed with a plurality of second protrusions 35. In addition, in the present embodiment, the disk portion 36 has three second protrusions 35. The plurality of second protrusions 35 are arranged at circumferentially spaced intervals in the radial middle portion of the disc portion 36. The second protrusion 35 projects to the first side in the axial direction. The plurality of second protrusions 35 are arranged apart from an inner peripheral surface 37a of the tubular portion 37. A gap is secured between the outer peripheral surface of the second protrusion 35 and the inner peripheral surface 37a of the tubular portion 37.

The tubular portion 37 is arranged so as to overlap the tubular portion 21 of the pressure plate 20 when viewed in the radial direction. Further, the tubular portion 21 of the pressure plate 20 is arranged so as to be inserted into the gap between the tubular portion 37 and the second protrusion 35.

As illustrated in FIG. 5, the second protrusion 35 has a second cam protrusion 31 and a second fixing protrusion 32. The second cam protrusion 31 and the second fixing protrusion 32 are arranged in the circumferential direction. The second cam protrusion 31 and the second fixing protrusion 32 are formed as one member.

The second cam protrusion 31 has a CC-cam surface 61a.

Height of the second fixing protrusion 32 is higher than height of the second cam protrusion 31. That is, a front end surface 32a (end surface on the first side in the axial direction) of the second fixing protrusion 32 is located on the first side in the axial direction with respect to the front end surface 31a of the second cam protrusion 31. The height of the second fixing protrusion 32 is lower than the height of the tubular portion 37. The height of the second fixing protrusion 32 is a length of the second fixing protrusion 32 in the axial direction.

The outer peripheral surface of the second fixing protrusion 32 has a shape along the inner peripheral surface of the positioning portion 19c of the support plate 10, and both are in contact with each other. By the contact between the two, the support plate 10 is positioned in the radial direction with respect to the clutch center 30.

Further, a second fitting hole 32d extending in the axial direction is formed at a central portion of the second fixing protrusion 32. The second fitting hole 32d is a gap between an inner wall surface of the clutch center 30 and the bolt 40. In the central portion of the second fixing protrusion 32, a screw hole (not illustrated) extending in the axial direction extends further on the second side of the second fitting hole 32d.

The cylindrical portion 37 is formed to extend from an outer side portion of the disc portion 36 to the first side in the axial direction. The tubular portion 37 has a cylindrical main body 371 and a plurality of second teeth 372 for engagement formed on the outer peripheral surface of the main body 371.

The pressure receiving portion 38 is formed to extend further from an outer side portion of the tubular portion 37 to an outer peripheral side. The pressure receiving portion 38 is annular and has a friction surface on the first side in the axial direction. The pressure receiving portion 38 faces the clutch portion 70.

[Bolt 40]

As illustrated in FIG. 1, the bolt 40 connects the support plate 10 and the clutch center 30. In detail, in order to connect the support plate 10 and the clutch center 30, first, the front end surface 19a of the first fixing protrusion 19 of the support plate 10 and the front end surface 32a of the second fixing protrusion 32 of the clutch center 30 are contacted. After contacted, the bolt 40 penetrates the through hole of the first fixing protrusion 19 of the support plate 10. The bolt 40 is further screwed into the screw hole of the second fixing protrusion 32 of the clutch center 30. As a result, the clutch center 30 is fixed to the support plate 10.

[Anti-Slip Member 50]

Figure 6:
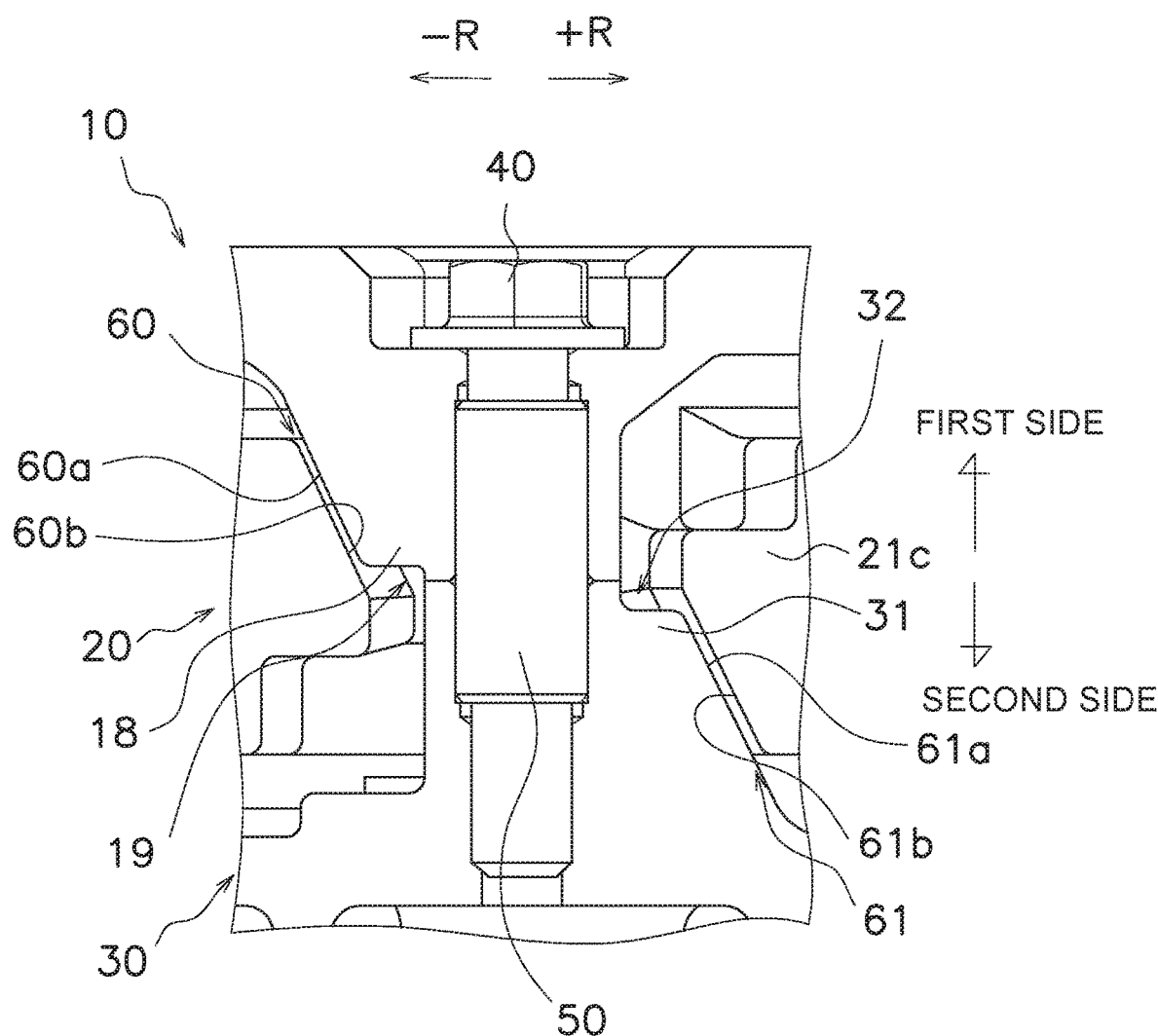
FIG. 6 is a view showing an anti-slip member.

As illustrated in FIGS. 1 and 6, an anti-slip member 50 fits into the first fitting hole 19d and the second fitting hole 32d. That is, the anti-slip member 50 exists in the gap between the bolt 40 and the inner wall surface of the support plate 10 and in the gap between the bolt 40 and the inner wall surface of the clutch center 30.

The shape of the anti-slip member 50 is not particularly limited. The shape of the anti-slip member 50 is, for example, a cylindrical shape.

A plurality of bolts 40 extend in the anti-slip member 50. The number of anti-slip members 50 is less than the number of bolts 40. In this embodiment, the number of anti-slip members 50 is two, and the number of bolts 40 is three.

The size of the anti-slip member 50 is not particularly limited as long as the first fitting hole 19d and the second fitting hole 32d can be fitted together.

The material of the anti-slip member 50 is not particularly limited, but is metal, for example.

[Cam Mechanism 60 and Slipper Cam Mechanism 61]

As illustrated in FIG. 6, a cam mechanism 60 is arranged between the support plate 10 and the pressure plate 20 in the axial direction. The cam mechanism 60 is a mechanism for increasing a coupling force of the clutch portion 70 when a driving force acts on the pressure plate 20 and the clutch center 30 (when a positive torque acts). The slipper cam mechanism 61 is arranged axially between the pressure plate 20 and the clutch center 30. The slipper cam mechanism 61 is a mechanism for reducing the coupling force of the clutch portion 70 when a reverse driving force acts on the clutch center 30 and the pressure plate 20 (when a negative torque acts).

<Cam Mechanism 60>

The cam mechanism 60 is an assist cam mechanism. The cam mechanism 60 includes a first cam surface 60a and a second cam surface 60b. The cam mechanism 60 is configured to move the pressure plate 20 in the axial direction when relative rotation occurs between the support plate 10 and the pressure plate 20.

As illustrated in FIGS. 2 and 3, the cam mechanism 60 includes a plurality of (here, three) first cam surfaces 60a provided on the support plate 10 and a plurality of (here, three) the second cam surface 60b on the pressure plate 20.

The first cam surface 60a is formed on the first cam protrusion 18 of the support plate 10. The first protrusion 15 is inserted into the cam hole 21c of the pressure plate 20. The first cam surface 60a is formed on one end surface of the first protrusion 15 in the circumferential direction.

The second cam surface 60b is configured by an inner wall surface that defines the cam hole 21c. The first cam surface 60a faces the circumferential direction and is inclined so as to face the second side in the axial direction. The second cam surface 60b is inclined so as to face the circumferential direction and the first side in the axial direction. Then, the first cam surface 60a can come into contact with the second cam surface 60b.

<Slipper Cam Mechanism 61>

As illustrated in FIGS. 4 and 5, the slipper cam mechanism 61 includes a plurality (here, three) of CC-cam surfaces 61a provided on the clutch centers 30 and a plurality of (here, three) PPs-cam surfaces 61b on the pressure plates 20.

The CC-cam surface 61a is formed on the second cam protrusion 31 of the clutch center 30. The second protrusion 35 is inserted into the cam hole 21c of the pressure plate 20. The CC-cam surface 61a is formed on one end surface of the second protrusion 35 in the circumferential direction.

The PPs-cam surface 61b is constituted by an inner wall surface defining the cam hole 21c. However, the second cam surface 60b and the PPs-cam surface 61b are formed to be displaced in the axial direction. The PPs-cam surface 61b is inclined with respect to the circumferential direction in the same direction as the CC-cam surface 61a at the same angle. The CC-cam surface 61a can come into contact with the PPs-cam surface 61b.

[Motion]

When a release operation is not performed in the clutch device 100, the support plate 10 and the pressure plate 20 are energized by the coil spring 80 in directions away from each other. Since the support plate 10 is fixed to the clutch center 30 and does not move in the axial direction, the pressure plate 20 moves to the second side in the axial direction. As a result, the clutch unit 70 is in the clutch-on state.

In such a state, a torque from an engine is transmitted to the clutch center 30 and the pressure plate 20 via the clutch portion 70.

Next, the operations of the cam mechanism 60 and the slipper cam mechanism 61 will be described in detail.

When a driving force is acting on the clutch center 30 and the pressure plate 20, that is, when a positive torque is acting, the input torque is output to the clutch center 30 and the pressure plate 20 via the clutch portion 70. The torque input to the pressure plate 20 is output to the support plate 10 via the cam mechanism 60. The torque input to the support plate 10 is output to the clutch center 30 via the fixing protrusions 19 and 32. In this way, the torque is transmitted from the pressure plate 20 to the support plate 10, and at the same time, the cam mechanism 60 operates.

Specifically, when a driving force is applied, the pressure plate 20 rotates relative to the support plate 10 in +R direction of FIG. 6. Then, the second cam surface 60b is pressed against the first cam surface 60a. Here, since the clutch center 30 does not move in the axial direction, the support plate 10 also does not move, and the second cam surface 60b moves along the first cam surface 60a, as a result, the pressure plate 20 moves in the second axial direction. That is, the pressing portion 22 of the pressure plate 20 moves toward the pressure receiving portion 38 of the clutch center 30. As a result, the clutch portion 70 is firmly sandwiched between the pressing portion 22 and the pressure receiving portion 38, and the coupling force of the clutch increases.

When the cam mechanism 60 operates as described above, the clutch center 30, the support plate 10, and the pressure plate 20 relatively rotate by a predetermined angle. At this time, when the torque is input to the pressure plate 20, the torque is transmitted to the clutch center 30 on the output side through the first cam surface 60a of the support plate 10.

Here, it is considered that loosening of the bolt 40 occurs due to the following reason. Due to the torque transmission, slip occurs on a fastening surface between the support plate 10 and the clutch center 30. Specifically, there is a slight gap between the bolt 40 and the inner wall surface of the through hole of the support plate 10 from the viewpoint of assembling. Therefore, when torque is input to the pressure plate 20, the support plate 10 is pushed by the torque transmitted through the cam mechanism 60, and the support plate 10 slides by the gap. Due to this slip, a seating surface of the bolt 40 moves, and the axial force of the bolt 40 decreases. When the axial force of the bolt 40 decreases, the fastening surface further slips. As a result, the bolt 40 becomes loose.

In the device of the present embodiment, the anti-slip member 50 that fits into the first fitting hole 19d and the second fitting hole 32d is arranged. Therefore, even if a torque input to the pressure plate 20 is transmitted to the clutch center 30 via the cam mechanism 60, the anti-slip member 50 can suppress the slip of the fastening surface between the support plate 10 and the clutch center 30. Thereby, the movement of the seat surface of the bolt 40 can be suppressed, and decrease in the axial force of the bolt 40 can be suppressed. As a result, it is possible to suppress loosening of the bolt 40 between members without reducing the torque input to the fastening surface between the members.

In the device of the present embodiment, the number of anti-slip members 50 is less than the number of bolts 40, so that the support plate 10 and the clutch center 30 can be easily assembled. The larger the number of the anti-slip members 50, the more the loosening of the bolt 40 can be reduced. However, the higher the number of the anti-slip members 50, the higher a positional accuracy required. Specifically, when all the plurality of bolts 40 are assembled so as to extend inside the anti-slip member 50, it becomes difficult to align the positions of the holes of all the anti-slip members 50 with the positions of all the bolts 40. In addition, the anti-slip member 50 itself may be displaced, which also deteriorates assembling property (a high degree of positional accuracy is required). As described above, if the bolts 40 are assembled so that only some of (at least one of) the bolts 40 extend inside the anti-slip member 50, the assembling property is improved.

When an accelerator is loosened, a reverse driving force acts via the clutch center 30, and in this case, the slipper cam mechanism 61 operates. That is, the clutch center 30 rotates relative to the pressure plate 20 in +R direction of FIG. 6 by the torque from the transmission side. Conversely, the pressure plate 20 rotates with respect to the clutch center 30 in −R direction in FIG. 6. Due to this relative rotation, the CC-cam surface 61a and the PPs-cam surface 61b are pressed against each other. Since the clutch center 30 does not move in the axial direction, this pressing moves the PPs-cam surface 61b along the CC-cam surface 61a, and the pressure plate 20 moves to the first side in the axial direction. As a result, the pressing portion 22 moves in the direction away from the pressure receiving portion 38, and the clutch coupling force is reduced.

[Other Embodiments]

The present invention is not limited to the above embodiments, and various changes or modifications can be made without departing from the scope of the present invention.

Modification 1

Figure 7:
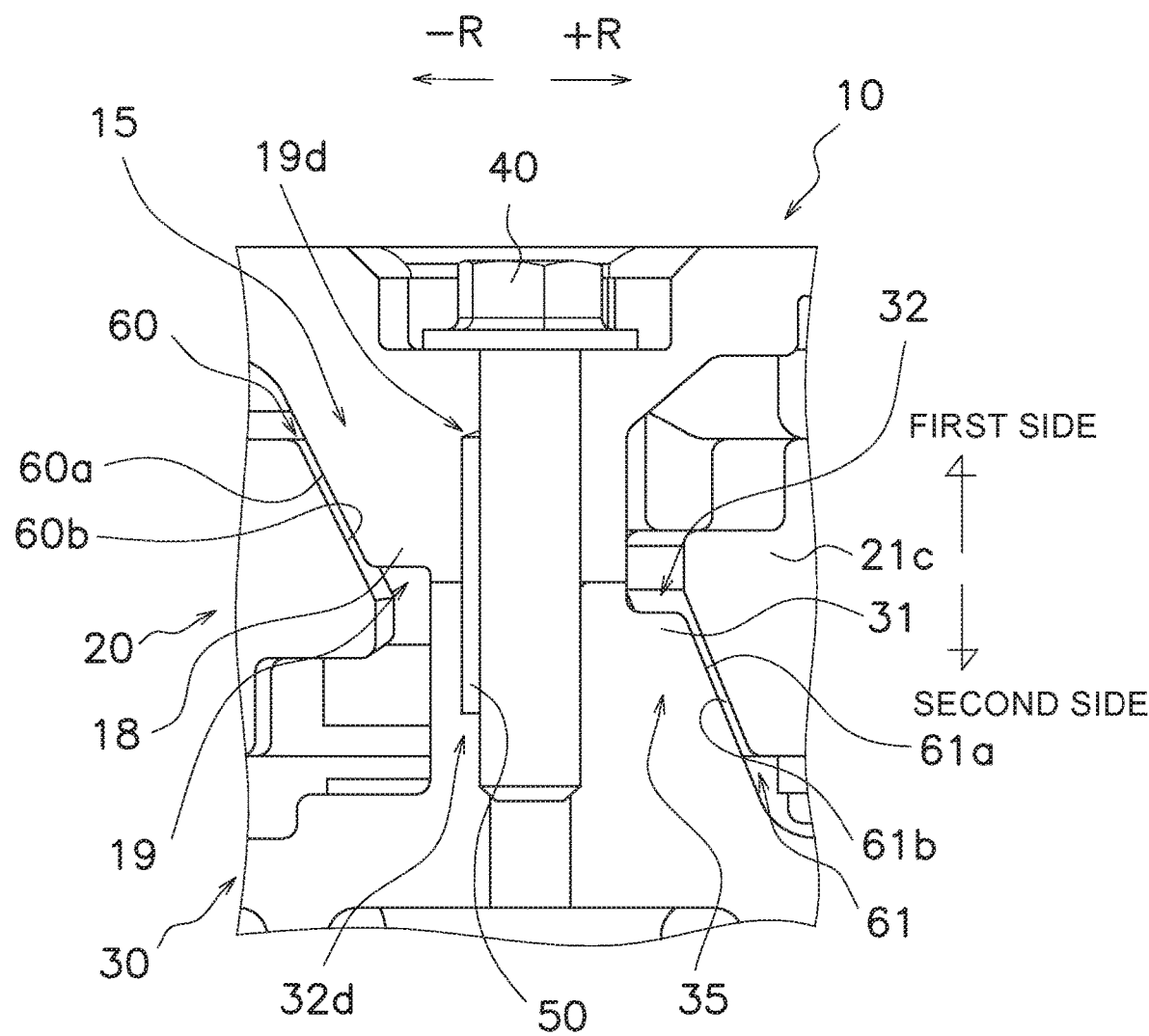
FIG. 7 is a view showing another embodiment of an anti-slip member.

In the above embodiment, the anti-slip member 50 has a cylindrical shape, but the present invention is not limited to this. For example, as illustrated in FIG. 7, the anti-slip member 50 may have a substantially prismatic shape, and one surface of the prism may be along the surface of the bolt 40. In this case, one or more anti-slip members 50 are arranged around each bolt 40 with respect to one bolt 40. The size of the anti-slip member 50 is not particularly limited as long as the first fitting hole 19d and the second fitting hole 32d can be fitted together.

Modification 2

The anti-slip member 50 may have a substantially plate shape. In this case, the surface, in which the anti-slip member 50 extends, contacts the surface of the bolt 40 in the axial direction.

Modification 3

In the above embodiment, the seat surface of the bolt 40 is arranged on the support plate 10 side, but the present invention is not limited to this. For example, the seating surface of the bolt 40 may be arranged on the clutch center 30 side. In this case, the bolt 40 is screwed onto the support plate 10. In this case, it is possible to prevent the bolt 40 from loosening during the operation of the slipper cam mechanism 61.

Modification 4

In the above embodiment, the support plate 10 is described as an example of the first rotor, the pressure plate 20 is an example of the second rotor, and the clutch center 30 is an example of the third rotor. That is, in the above embodiment, the present invention is applied to a so-called pull type clutch device 100, in which the pressure plate 20 is moved to the first side in the axial direction and the clutch portion 70 is turned off, but the present invention can be similarly applied to a so-called push type clutch device.

Figure 8:
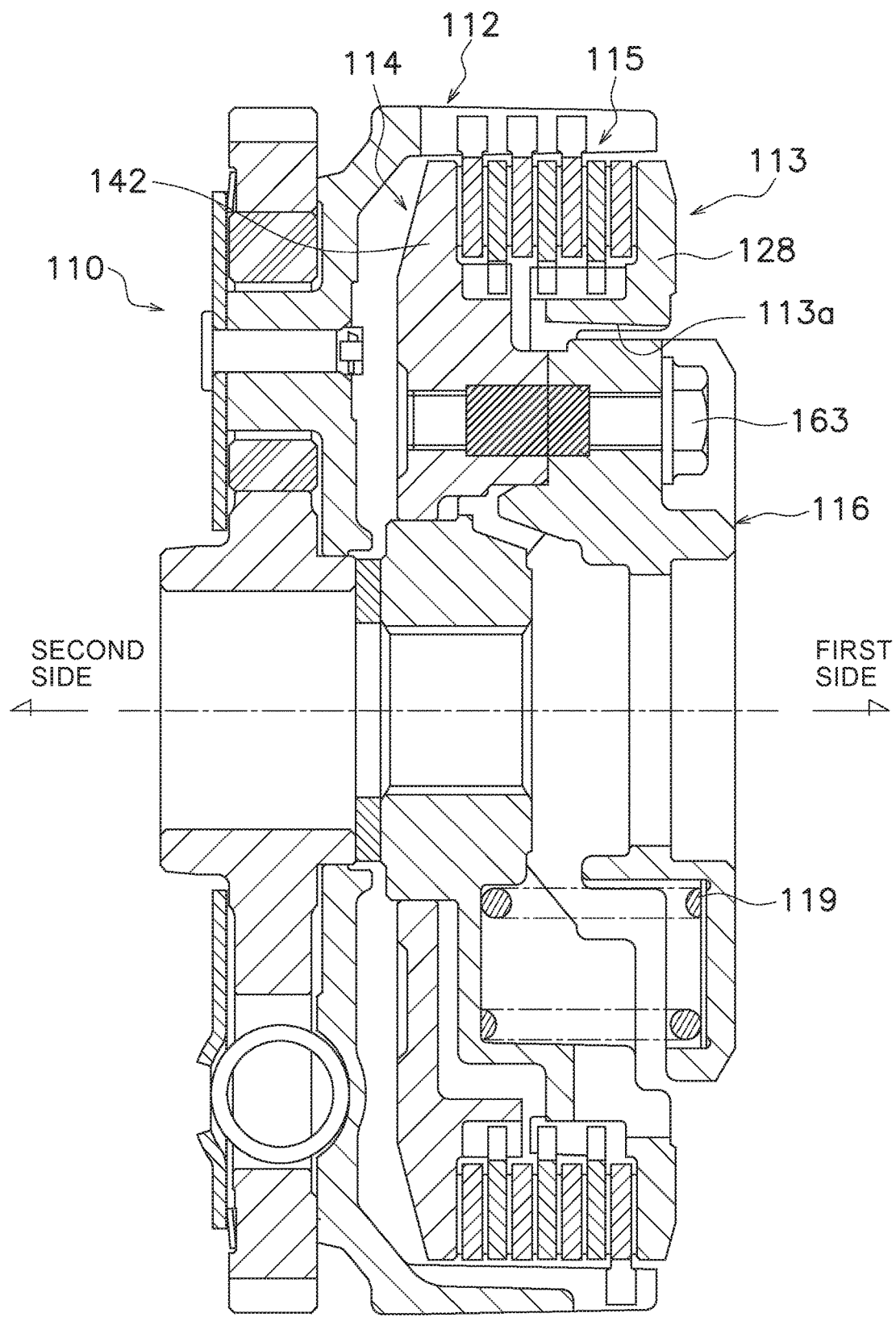
FIG. 8 is a cross-sectional view of a push-type clutch device according to another embodiment.

FIG. 8 shows a push type clutch device.

The push-type clutch device 110 includes a lifter plate 116 (an example of a first rotor), a clutch center 113 (an example of a second rotor), and a pressure plate 114 (an example of a third rotor).

Specifically, in the push-type clutch device 110, the pressure plate 114, the clutch center 113, and the lifter plate 116 are arranged from the first side to the second side in the axial direction. The pressure plate 114 and the lifter plate 116 are fixed to each other by a bolt 163 through an opening 113*a* formed in the clutch center 113. A coil spring 119 is arranged between the clutch center 113 and the lifter plate 116. Further, the clutch portion 115 is arranged between the pressing portion 142 of the pressure plate 114 and the pressure receiving portion 128 of the clutch center 113. Similar to the pull type clutch device 100, each of these members is housed inside the clutch housing 112.

Since the clutch center 113 does not move in the axial direction, the lifter plate 116 is energized by the coil spring 119 toward the first axial side. That is, the pressure plate 114 fixed to the lifter plate 116 is energized toward the first side in the axial direction, the pressure plate 114 is pressed against the clutch center 113, and the clutch portion 115 is in the ON state.

Then, by moving the lifter plate 116 and the pressure plate 114 to the second side in the axial direction against the energizing force of the coil spring 119, the clutch portion 115 is turned off.

Modification 5

The configurations of the pressure plate 20 and the clutch center 30 are not limited to those in the above embodiment. For example, in the above embodiment, the disc portion 36, the tubular portion 37, and the pressure receiving portion 38 of the clutch center 30 are integrally formed, but they may be formed of different members. The same applies to the pressure plate 20, and the boss portion 25, the tubular portion 21, and the pressing portion 22 may be formed of different members.

REFERENCE SIGNS LIST

10 Support plate (first rotor)
20, 114 Pressure plate (second rotor)
30, 113 Clutch center (3rd rotor)
40 Bolt
50 Anti-slip member
60, 117 Cam mechanism
60*a* First cam surface
60*b* Second cam surface
70, 115 Clutch part
100, 110 Clutch device

What is claimed is:

1. A clutch device comprising:
a first rotor including a first cam surface and a first fitting hole, the first fitting hole extending in an axial direction;
a second rotor including a second cam surface, the second cam surface configured to press the first cam surface in a circumferential direction, the second rotor being movable in the axial direction and rotatable relative to the first rotor;
a third rotor fixed to the first rotor, the third rotor including a second fitting hole, the second fitting hole facing the first fitting hole and extending in the axial direction;
at least one bolt connecting the first rotor and the third rotor;
at least one anti-slip member fitted into the first fitting hole and the second fitting hole; and
a cam mechanism including the first cam surface and the second cam surface, the cam mechanism configured to move the second rotor in the axial direction when relative rotation occurs between the first rotor and the second rotor, wherein
the at least one bolt includes a plurality of bolts, and a number of the at least one anti-slip member is less than a number of the plurality of bolts.

2. The clutch device according to claim 1, wherein each of the plurality of bolts extends within the at least one anti-slip member.

3. The clutch device according to claim 1, wherein the plurality of bolts are arranged at intervals in the circumferential direction, and
at least one of the plurality of bolts extends inside the at least one anti-slip member.

4. The clutch device according to claim 1, wherein the first rotor is a support plate,
the second rotor is a pressure plate, and
the third rotor is a clutch center.

* * * * *